United States Patent [19]

Feldhake

[11] 3,997,365
[45] Dec. 14, 1976

[54] BATTERY HAVING POLYAMIDE HOT MELT ADHESIVE SEAL

[75] Inventor: Ralph H. Feldhake, Verona, Wis.

[73] Assignee: ESB Incorporated, Philadelphia, Pa.

[22] Filed: Dec. 10, 1973

[21] Appl. No.: 424,414

Related U.S. Application Data

[63] Continuation-in-part of Ser. No. 258,751, June 1, 1972, abandoned.

[52] U.S. Cl. .............................................. 429/185
[51] Int. Cl.² ........................................ H01M 2/08
[58] Field of Search ................... 136/111, 133, 145

[56] References Cited

UNITED STATES PATENTS

| 3,262,818 | 7/1966 | Pasquale et al. | 136/111 |
| 3,674,565 | 7/1972 | Betgum et al. | 136/111 |
| 3,701,690 | 10/1972 | Dermody et al. | 136/145 |
| 3,713,896 | 1/1973 | Feldhake | 136/133 |
| 3,715,239 | 2/1973 | Walker et al. | 136/133 |
| 3,922,178 | 11/1975 | Winger | 136/133 |

Primary Examiner—Daniel E. Wyman
Assistant Examiner—Thomas A. Waltz

[57] ABSTRACT

A battery has a peripheral seal which surrounds the electrodes. The seal comprises a plurality of layers adhered together, one of which layers is metal and another one of which is plastic. The seal is produced between the metal and plastic layers, uses a hot melt adhesive containing substantial amounts of polyamide having a viscosity of from about 1 poise to about 100 poise at 350° F.

12 Claims, 8 Drawing Figures

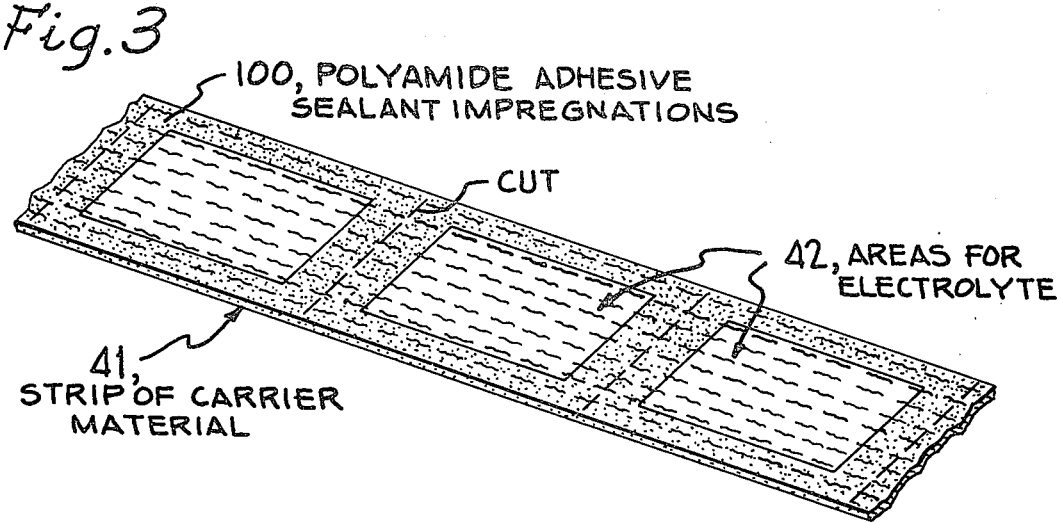
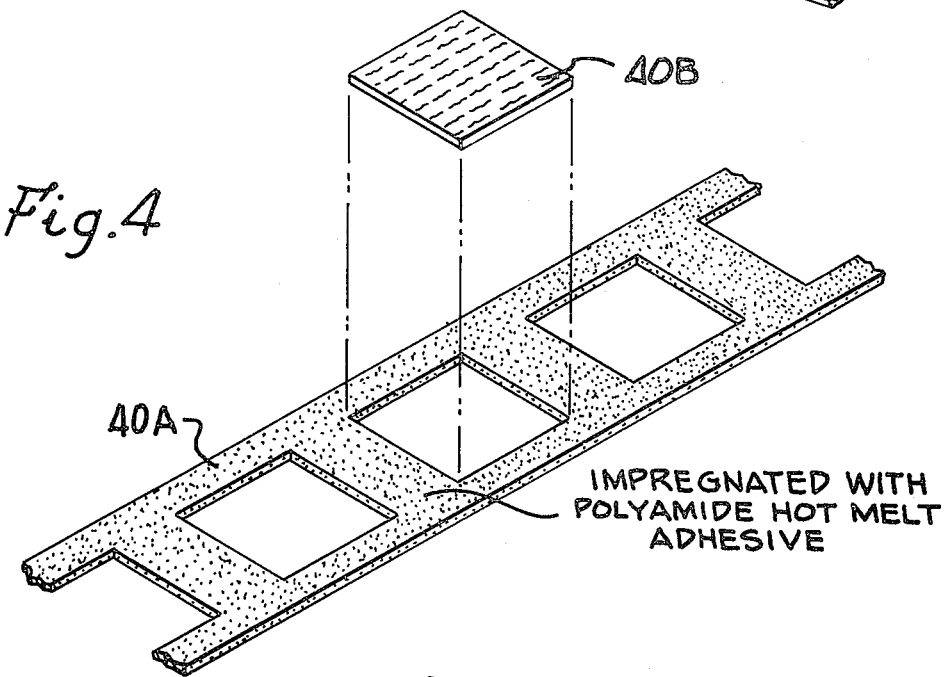
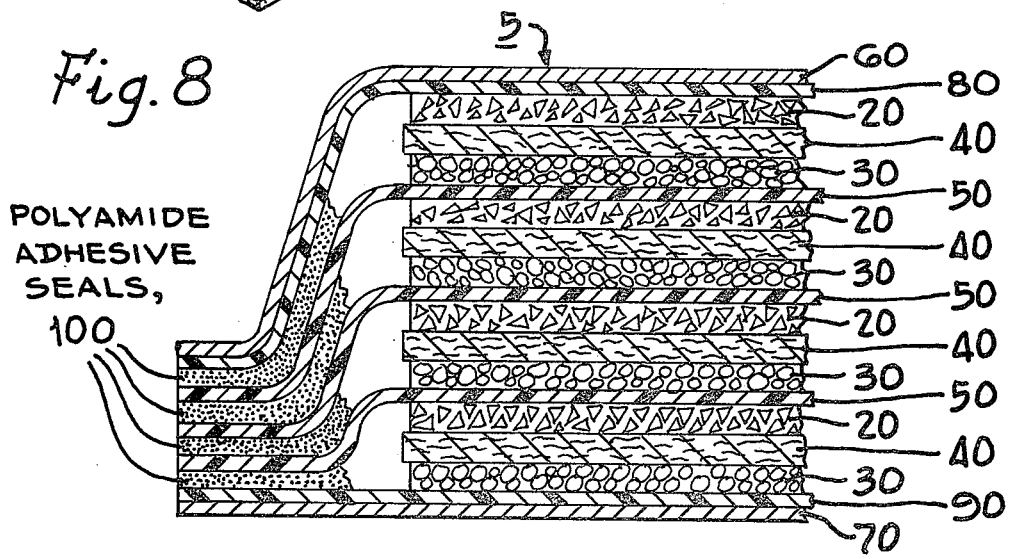

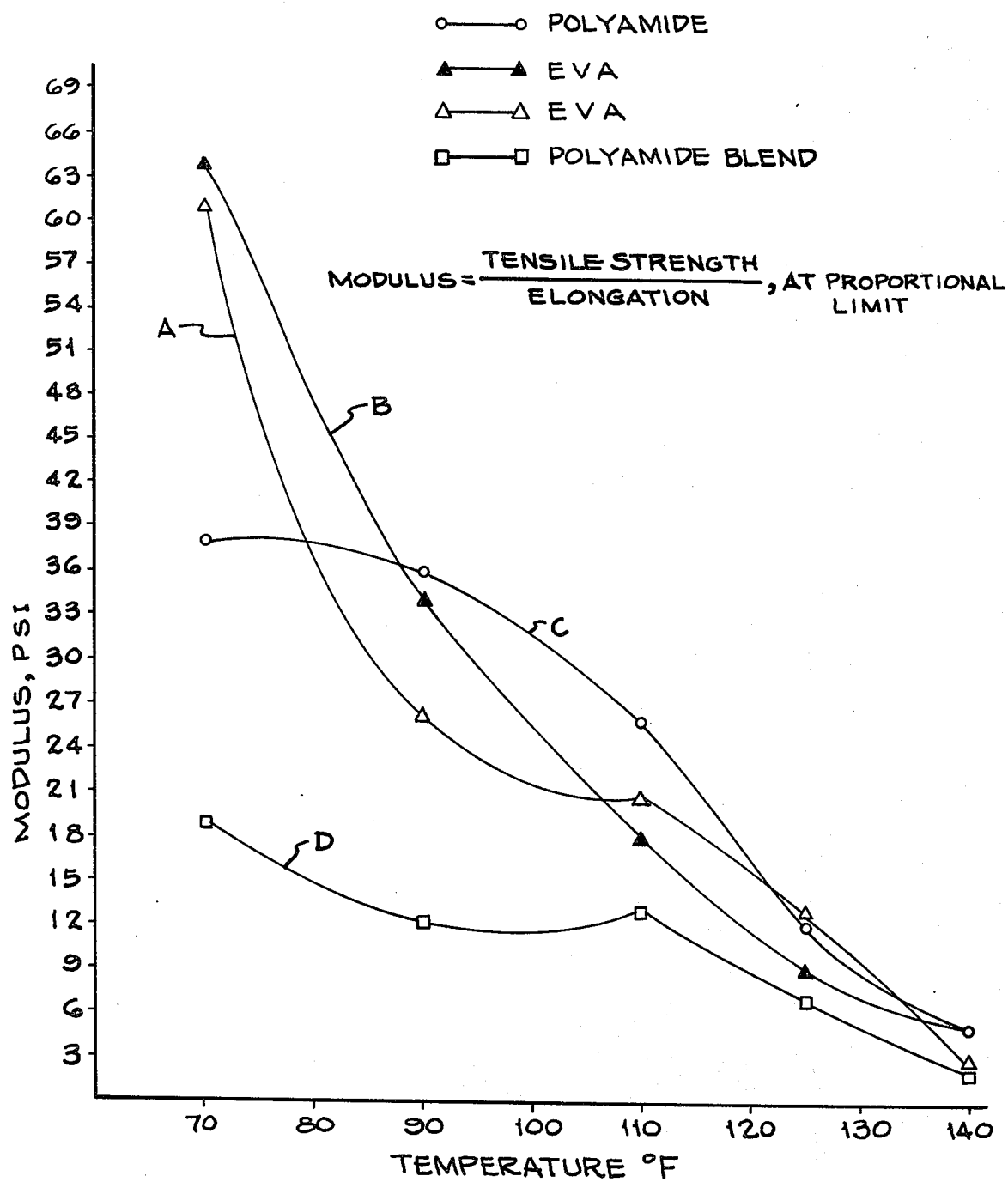

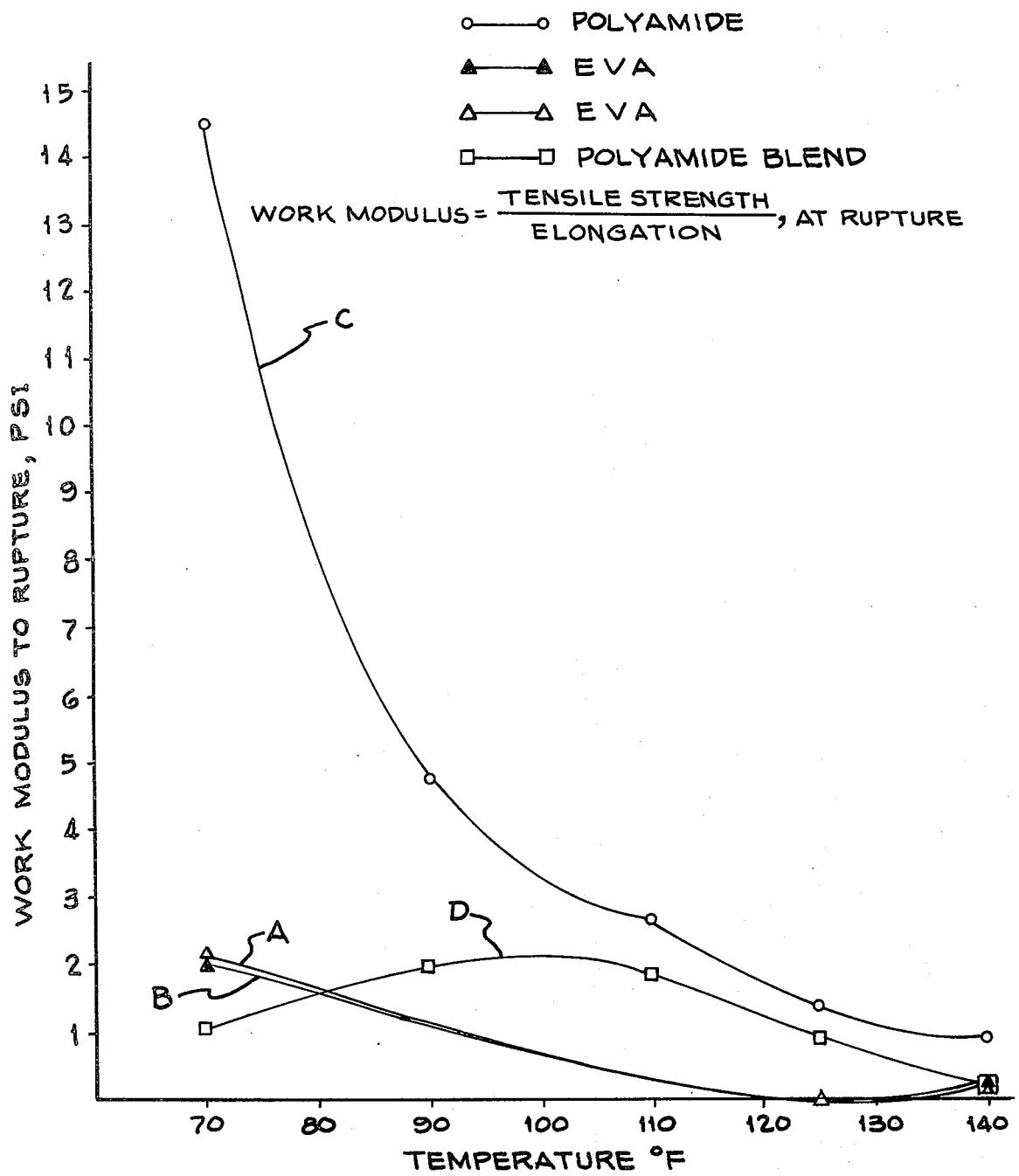

BATTERY HAVING POLYAMIDE HOT MELT ADHESIVE SEAL

CROSS-REFERENCE TO RELATED APPLICATION

This is a continuation-in-part of my application Ser. No. 258,751, filed June 1, 1972 now abandoned.

BACKGROUND OF THE INVENTION

It has previously been suggested to provide a seal around the periphery of a battery, the seal comprising a plurality of layers adhered together and including a metal layer and a hot melt adhesive layer. The hot melt adhesive is activated and the seal is produced by heating the adhesive and other layers in the peripheral area and then letting them cool.

The choice of an adhesive for such purposes is based upon the chemical, physical, and physical-chemical properties which the given adhesive exhibits in its application to a particular seal.

Chemical properties are those such as resistance to the chemical environment of the battery.

The physical properties of an adhesive are customarily measured with bulk property measurements such as tensile strength at rupture, and modulus. The modulus is defined as the stress divided by the strain within the proportional limit (elastic limit) of the stress-strain curve.

The physical-chemical properties which are usually associated with seal materials are measured by means of adhesion measuring techniques to the substrate surfaces involved in the seal.

The selection of the proper adhesive is made difficult due to the presence of the metal layer in the peripheral seal. In addition to being able to withstand higher tensile and shear stresses than the adhesive, the metal also changes dimensions to a much lesser degree than does the adhesive during the cooling step.

SUMMARY OF THE INVENTION

The invention relates to a plurality of layers which are adhered together to produce a seal around the periphery of a battery. The layers include one which is metal, one which is a plastic layer, and a hot melt adhesive between the metal and plastic layers.

Quite unexpectedly I have discovered that the adhesive which gives significantly superior results is one which contains substantial amounts of polyamide and which has a viscosity of from about 1 poise to about 100 poise at 350° F. The ratio of the tensile strength of this adhesive at its rupture to the elongation of the adhesive at its rupture is: at 70° F, at least about 3 psi; at 90° F, at least about 2 psi; at 110° F, at least about 2 psi; at 125° F, at least about 1 psi; and at 140° F, at least about 1 psi.

The polyamide adhesive has been found to produce good seals in batteries including those containing acidic electrolytes.

BRIEF DESCRIPTION OF THE DRAWINGS

FIG. 3 shows a strip of continuous carrier material into which have been impregnated a series of closed loop polyamide hot melt adhesive patches.

FIG. 4 illustrates a piece of carrier material containing polyamide hot melt adhesive loops. A void area is inside each patch, the void area being provided to receive a piece of separator material during assembly of the battery.

FIG. 6 shows the relationship between modulus and temperature of four adhesive materials.

FIG. 7 shows the relationship between another modulus and temperature of four adhesive materials.

FIG. 8 shows a cross-section of a multicell battery having some construction features which differ from those shown in FIG. 2.

DESCRIPTION OF THE PREFERRED EMBODIMENTS

Figure 1:
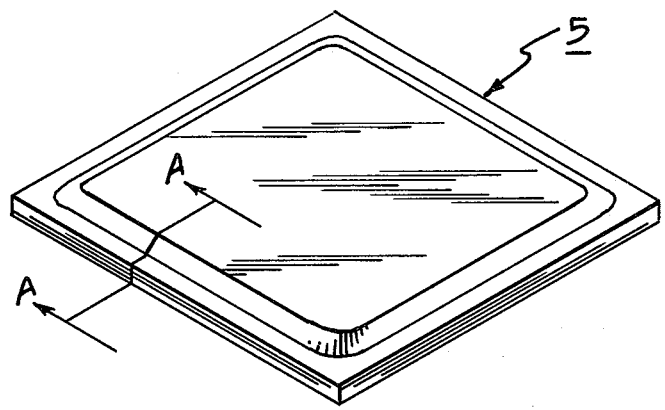
FIG. 1 is an oblique view of a multicell battery having a peripheral hot melt polyamide adhesive seal surrounding the electrodes and electrolyte layer.
Figure 2:
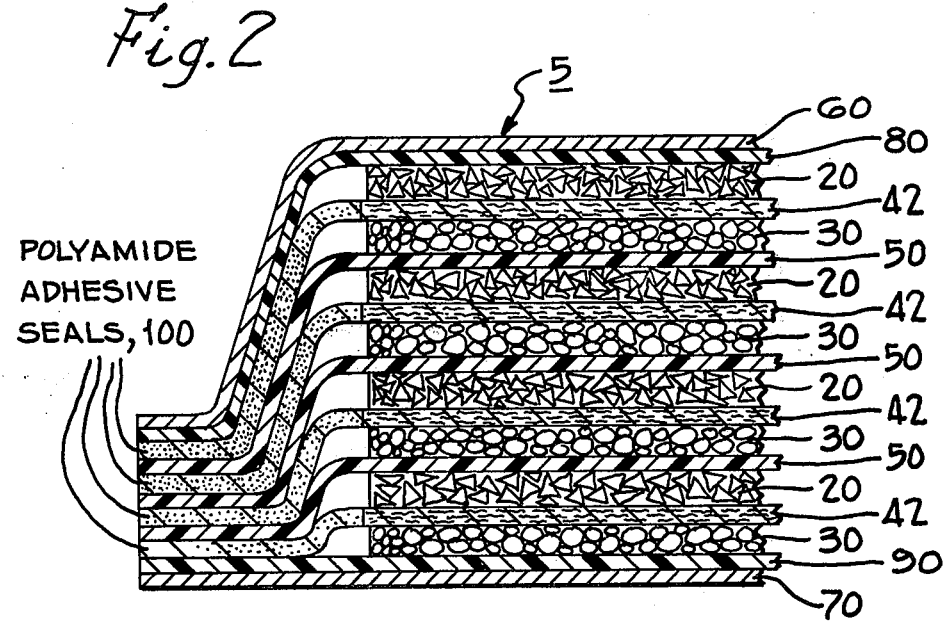
FIG. 2 illustrates a cross-section of the battery shown in FIG. 1, taken along the line A—A of FIG. 1. The thickness of the battery is shown greatly magnified for purposes of illustration.

FIGS. 1 and 2 are oblique and cross-sectional views, respectively, of a battery 5 comprising four cells 10. Each cell 10 comprises a positive electrode 20, a negative electrode 30, and an electrolyte containing layer 42 separating the positive electrode from the negative electrode. Between each adjacent pair of cells 10 are intercell connector layers 50 made from an electrically conductive, liquid-impervious plastic; the intercell connector layers 50 shown in FIG. 2 extend beyond the edges of the electrodes 20 and 30 and electrolyte containing layers 42. Wrapper members which extend over the surfaces of and beyond the edges of the terminal electrodes are at the top and bottom of the battery; the upper wrapper member shown in FIG. 2 comprises a laminate of an outer metal layer 60 and an inner layer of electrically conductive plastic 80, while the lower wrapper correspondingly comprises a laminate of an outer metal layer 70 and an inner layer of electrically conductive plastic 90.

FIG. 3 illustrates a continuous carrier strip 41 of separator material into which are impregnated a series of closed loop adhesive impregnations; electrolyte is subsequently applied in the areas inside the impregnations, and the strip may be cut between successive impregnations to produce segments each of which is used in one cell of a battery. The adhesive impregnations are used in the production of peripheral seals in the battery. For more information, see U.S. Pat. No. 3,701,690. Alternatively, as shown in FIG. 4, a hot melt adhesive may be impregnated into a carrier strip 40A having openings therein into which separators 40B containing the electrolyte are later added; again, the carrier strip 40A may be cut into segments if desired and each adhesive impregnation is used to produce a peripheral seal in a battery.

Referring again to FIG. 2, each cell 10 is surrounded by a peripheral seal 100 which comprises a plurality of layers adhered together. As specifically illustrated in FIG. 2, the seal results from and comprises: the extensions of the upper and lower wrapper members comprising laminates of conductive plastic with metal (plastic 80 and metal 60 in the upper member, plastic 90 and metal 70 in the lower member); the extensions of the conductive plastic intercell connectors 50; and the hot melt adhesives impregnated into a carrier strip, as illustrated by either FIG. 3 or FIG. 4.

As required by this invention, the hot melt adhesive contains substantial amounts of polyamide having a viscosity of from about 1 poise to about 100 poise at 350° F. The adhesive is activated by direct heating means or by other techniques such as ultrasonics and the peripheral seal is produced by heating the adhesive and other layers in the seal area and then letting them cool down. During the cooling step the metal layers change dimensions to a much lesser extent than do the adhesive and other layers, a fact which significantly complicates the achievement of a good seal. Due to the non-uniform dimensional changes of the differing materials which extend into the seal area, the adhesive is placed under tension and/or shear stresses, and it is a weaker material in tension and shear than the metal used in layers 60 and 70. The approach of a designer wishing to select the best adhesive material, therefore, is likely to be to look for the adhesive having good adhesion properties and high tensile and shear strengths. To my surprise, I have found that the polyamide adhesives of my invention, while having tensile strengths and other commonly measured properties which are not superior to those of other adhesives, nevertheless produce strikingly superior seals in batteries.

Illustrative of this are the test results obtained from four different materials. Material A was an ethylene vinyl acetate (EVA) supplied by H. B. Fuller under Fuller's designation S-5029. Material A contained ethylene vinyl acetate, microcrystalline wax, and adhesion promoting resins and had a viscosity of 15 poise at 350° F.

Material B was also an EVA supplied by H. B. Fuller under Fuller's designation S-5030 containing the same ingredients as Material A but in different proportions and having a viscosity of 22 poise at 350° F.

Material C was a polyamide supplied by General Mills under General Mills designation TPX 617. Material C was the reaction product of a dimerized fatty acid and ethylene diamine and had a viscosity of 13 poise at 375° F.

Material D was a blend supplied by Williamson Adhesives under Williamson's designation 3-280-B. Material D comprised two different polyamides and other components believed to be isobutylene rubber and an isoprene resin; the non-polyamide components are believed to have comprised approximately 20°% by weight of the total blend. Material D had a viscosity of 52 poise at 350° F.

Figure 5:
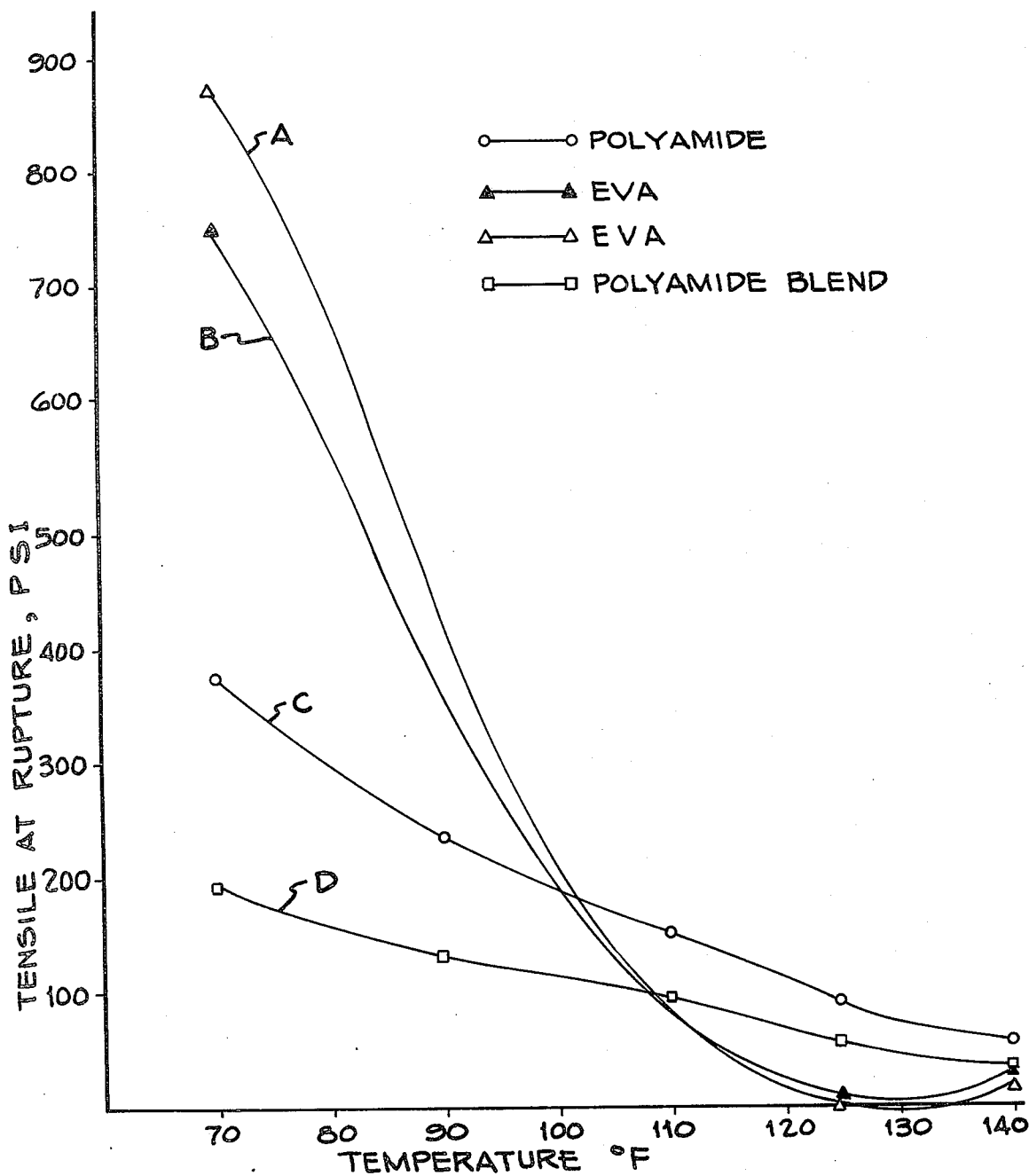
FIG. 5 shows the relationship between tensile strength and temperature of four adhesive materials.

FIG. 5 demonstrates the relationship between the tensile strength of the four adhesive materials at rupture with changes in temperature. As FIG. 5 shows, at temperatures below about 100° F the two adhesives (C and D) containing substantial amounts of polyamide were significantly weaker in tension than were the two EVA adhesives.

FIG. 6 illustrates how a change in temperature affects another commonly measured property of adhesives, the modulus of rupture. This modulus is obtained by dividing the tensile strength of the adhesive at its proportional limit by its elongation per unit of length at the proportional limit. The modulus therefore reflects both the ability of an adhesive to withstand stress and its ability to elongate, both of which are important in the peripheral seal of the battery due to the differing rates of contraction of the different materials present there. As FIG. 6 shows, the two adhesives containing substantial amounts of polyamide fail to demonstrate superiority to the two EVA materials when compared by the modulus measurement.

The data represented by FIGS. 5 and 6 explain why, from the point of view of commonly measured physical properties, adhesives containing substantial amounts of polyamide would not normally be selected for use in the batteries described above. I have discovered and believe, however, that such polyamide adhesives offer superior results which can be demonstrated by measurements of another modulus or property which is not normally considered in adhesives selections, one in which the tensile strength and the elongation per unit of length are measured at the rupture point of the adhesive (not at the proportional limit, as in FIG. 6). I choose to regard this modulus as a measurement of the work or energy absorbed by the adhesive.

As shown by FIG. 7, for one or both of the polyamide-containing adhesives this modulus or ratio was: at least about 3 psi at 70° F; at least about 2 psi at 90° F; at least about 2 psi at 110° F; at least about 1 psi at 125° F; and at least about 1 psi at 140° F. The differences between FIGS. 6 and 7 suggest that above the proportional limit and up to the rupture points, the adhesives containing substantial proportions of polyamide can absorb a greater stress per unit of elongation than the adhesives which do not contain the polyamides. Thus the superiority of the adhesives containing polyamide is surprising and not expected.

It appears to me that in making an adhesive bond to such widely differing moduli materials as metal and plastics, the adhesive is stressed beyond its proportional limit.

An experiment has demonstrated that batteries having seals containing polyamide adhesive seals have significantly better shelf life than those sealed with EVA adhesives. Table 1 demonstrates this by showing the results after 14 days at an accelerated test (120° F), measured by the number and percent of batteries still exceeding a prescribed minimum electrical requirement and also as measured by the moisture loss.

TABLE 1

| ADHESIVE TYPE | NUMBER BATTERIES TESTED | GOOD BATTERIES AFTER 14 DAYS AT 120° F | | AVERAGE MOISTURE LOSS AFTER 14 DAYS AT 120° F, MG. |
|---|---|---|---|---|
| | | Number | % | |
| EVA Fuller S 5026 Lot 2651-X | 8 | 2 | 25 | 425 |
| EVA Fuller S 5026 Lot 2651-Y | 8 | 4 | 50 | 445 |
| Polyamide General Mills TPX 617 Lot 2651-T | 8 | 7 | 87 | 252 |

TABLE 1-continued

| ADHESIVE TYPE | NUMBER BATTERIES TESTED | GOOD BATTERIES AFTER 14 DAYS AT 120° F | | AVERAGE MOISTURE LOSS AFTER 14 DAYS AT 120° F, MG. |
| --- | --- | --- | --- | --- |
| | | Number | % | |
| General Mills TPX 617 Lot 2651-W | 8 | 5 | 62 | 206 |

The batteries represented by Table 1 were identical except for the choice of adhesives. Table 1 shows that a higher percentage of the batteries having polyamide seals passed the required minimum electrical test after 14 days than was true of batteries in which the adhesive seals did not contain polyamide, and that the polyamide-sealed batteries lost significantly less moisture. These results dramatize the superiority of the polyamides as adhesive materials in the batteries.

Other factors cause me also to be surprised that the polyamide is superior in the batteries tested. As mentioned in the Background, the adhesive must have chemical properties which are resistant to the chemical environment of the battery. All of the test data presented in FIGS. 5, 6, and 7 and in Table 1 were obtained from batteries including fatty acid type (e.g., Versamid types) adhesives and employing the LeClanche electrochemical system, in which the electrolyte comprises an acidic solution of ammonium chloride and/or zinc chloride. According to a table found at page 35 of the October, 1973 issue of Adhesives Age magazine (a publication by Palmerton Publishing Co., 101 West 31st Street, New York, N.Y.) the Versamid types of polyamide hot melt adhesives have extremely poor resistance to acids.

Similarly, the physical-chemical properties of adhesives are usually measured by techniques (e.g., the peel strength) which determine the ability of the adhesive to adhere to a substrate surface. In the batteries tested, which were similar in construction to the battery shown in FIGS. 1 and 2, the electrically conductive plastics 50, 80, and 90 were made from a polyvinylchloride. Pages 31 to 33 of the October, 1973 issue of Adhesives Age indicates that polyamides adhesives (Versamid types) are not suitable materials for bonding to adherends of polyvinylchloride and acrylonitrile rubber.

While this invention requires the presence of at least one metal layer in the peripheral seal area and the use of a hot melt adhesive containing substantial amounts of polyamide, it is not limited to many of the details described above and illustrated in FIGS. 2 through 4. FIG. 8, for instance, shows the polyamide adhesive present in the seal area as deposits on and between the conductive plastic 50, 80, or 90 rather than as impregnations in a carrier (FIGS. 2 through 4).

The practical range of the hot melt adhesive required by my invention appears to be from about 1 poise to about 100 poise at 350° F. The temperature of 350° F. is chosen since it is a temperature at which the adhesive is sufficiently liquid to wet the surfaces of the surrounding layers. Below the 1 poise lower limit the adhesive is too fluid, and above the 100 poise upper limit the adhesive is too viscous, to get good seals. A viscosity of not less than 5 poise at 350° F. is preferred.

While the hot melt adhesives required by my invention must contain substantial amounts of polyamide, they may also contain significant amounts of other materials for purposes such as improving stability, increasing specific adhesion, lowering the cost, and/or others.

The polyamide may exist with other materials in the form of emulsions or solutions. A viscosity of not less than 5 poise at 350° F is preferred.

The viscosities referred to herein were measured by Brookfield (ASTM D2669).

While it is unexpected and surprising that the polyamide adhesive produces superior results in an acidic electrolyte environment, the use of this invention is not limited to batteries having acidic electrolytes. Batteries containing alkaline electrolytes may still benefit from the inclusion of my invention if the peripheral seal contains at least one metal layer.

I claim:

1. An improvement in a battery comprising
  a. a positive electrode,
  b. a negative electrode,
  c. an electrolyte containing layer separating the electrodes, and
  d. a peripheral seal surrounding the electrodes and electrolyte layer, the seal comprising a plurality of layers adhered together and including a metal layer, a plastic layer, and a hot melt adhesive layer between the metal and plastic layers,
wherein the improvement is characterized by
  e. the hot melt adhesive layer comprises fatty acid polyamide having a viscosity of from about 1 poise to about 100 poise at 350° F.

2. The battery of claim 1 in which, at 70° F, the ratio of the tensile strength of the adhesive at its rupture to the elongation of the adhesive at its rupture is at least about 3 psi.

3. The battery of claim 1 in which, at 90° F, the ratio of the tensile strength of the adhesive at its rupture to the elongation of the adhesive at its rupture is at least about 2 psi.

4. The battery of claim 1 in which at 110° F, the ratio of the tensile strength of the adhesive at its rupture to the elongation of the adhesive at its rupture is at least about 2 psi.

5. The battery of claim 1 in which, at 125° F, the ratio of the tensile strength of the adhesive at its rupture to the elongation of the adhesive at its rupture is at least about 1 psi.

6. The battery of claim 1 in which, at 140° F, the ratio of the tensile strength of the adhesive at its rupture to the elongation of the adhesive at its rupture is at least about 1 psi.

7. The battery of claim 1 in which the electrolyte is acidic, the seal is acid resistant, and the seal is exposed to the acidic electrolyte.

8. The battery of claim 2 in which the electrolyte is acidic, the seal is acid resistant, and the seal is exposed to the acidic electrolyte.

9. The battery of claim 3 in which the electrolyte is acidic, the seal is acid resistant, and the seal is exposed to the acidic electrolyte.

10. The battery of claim 4 in which the electrolyte is acidic, the seal is acid resistant, and the seal is exposed to the acidic electrolyte.

11. The battery of claim 5 in which the electrolyte is acidic, the seal is acid resistant, and the seal is exposed to the acidic electrolyte.

12. The battery of claim 6 in which the electrolyte is acidic, the seal is acid resistant, and the seal is exposed to the acidic electrolyte.

* * * * *